United States Patent
Johnson et al.

(10) Patent No.: US 7,370,833 B2
(45) Date of Patent: May 13, 2008

(54) METHOD AND SYSTEM FOR DETERMINING A SINGULARITY FREE MOMENTUM PATH

(75) Inventors: Daniel P. Johnson, Fridley, MN (US); Michael R. Elgersma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 195 days.

(21) Appl. No.: 11/256,414

(22) Filed: Oct. 20, 2005

(65) Prior Publication Data

US 2007/0102585 A1 May 10, 2007

(51) Int. Cl.
B64G 1/28 (2006.01)
(52) U.S. Cl. .................................................. 244/165
(58) Field of Classification Search .............. 244/164, 244/165
See application file for complete search history.

(56) References Cited

U.S. PATENT DOCUMENTS

| | | | | |
|---|---|---|---|---|
| 3,424,401 | A | * | 1/1969 | Maurer ...................... 244/165 |
| 6,039,290 | A | | 3/2000 | Wie et al. |
| 6,047,927 | A | * | 4/2000 | Heiberg et al. ............. 244/165 |
| 6,113,033 | A | * | 9/2000 | Parks et al. ................. 244/165 |
| 6,131,056 | A | * | 10/2000 | Bailey et al. ................. 701/13 |
| 7,246,776 | B2 | * | 7/2007 | Peck et al. .................. 244/171 |
| 2004/0111194 | A1 | | 6/2004 | Wie |
| 2004/0167683 | A1 | | 8/2004 | Lagadec et al. |

FOREIGN PATENT DOCUMENTS

WO 9950144 10/1999

OTHER PUBLICATIONS

European Search Report for European Patent Application No. EP 06 12 2560, mailed Feb. 14, 2007.
Paradiso, Joseph A., "Global Steering of Single Gimballed Control Moment Gyroscopes Using a Directional Search," Journal of Guidance and Control and Dynamics, vol. 15, No. 5, Sep. 1992, pp. 1236-1244.
S. Basu, R. Pollack and M. Roy, "Computing Roadmaps of Semi-Algebraic Sets on a Variety," Journal of the American Mathematical Society, Jul. 20, 1999, pp. 55-82, vol. 13, No. 1.

* cited by examiner

Primary Examiner—Tien Dinh
(74) Attorney, Agent, or Firm—Ingrassia Fisher & Lorenz (57) ABSTRACT

A method for avoiding singularities in the movement of a set of collinear CMGs in an array of CMGs in a spacecraft is provided. First, a command to adjust an orientation of the spacecraft is received. Then, the momentum needed from the set of collinear CMGs is determined. A dynamic control that determines a momentum path and avoids singularities by rotating the singularities out of the momentum path is used and a required gimbal movement for each of the CMGs in the set of collinear CMGs from the momentum path is calculated.

10 Claims, 5 Drawing Sheets

METHOD AND SYSTEM FOR DETERMINING A SINGULARITY FREE MOMENTUM PATH

FIELD OF THE INVENTION

This invention relates to the field of spacecraft vehicle control and, more specifically, to a method and system for determining a singularity free momentum path.

BACKGROUND OF THE INVENTION

In order to control the attitude of a spacecraft, various rotating inertia memberscan be used. One such inertia member is a control moment gyroscope (CMG). A CMG typically comprises a flywheel with a fixed or variable spin rate mounted to a gimbal assembly. The spin axis of the CMG can be tilted by moving the CMG using the gimbal assembly. This motion produces a gyroscopic torque orthogonal to the spin axis and gimbal axis.

To achieve full attitude control of a spacecraft, a CMG array, including a minimum of three CMGs may be arranged such that each CMG in the CMG array imparts torque about a linearly independent axis. Typically, additional CMGs are provided for redundancy purposes and to assist with singularity avoidance. A singularity occurs when the momentum vectors of the CMGs line up such that one or more components of the requested torque can not be provided.

Several different techniques have been developed to avoid singularities. In one method it is first noted that a Jacobian A maps the CMG gimbal rates into a three dimensional array torque:

$$A\omega = \tau \quad (1)$$

where A is a 3×n Jacobian matrix, $\omega$ is a n×1 array of gimbal rates for the n gimbals, and $\tau$ is a 3×1 array of torque components to be imparted to the spacecraft. From the above equation and with a known torque command, $\tau$, the individual gimbal rates for each CMG can be calculated. Using the known Moore-Penrose pseudoinverse to invert the Jacobian matrix, a set of possible gimbal rates is:

$$\omega = A^T(AA^T)^{-1}\tau. \quad (2)$$

As discussed previously, inherent in the use of CMGs is the possibility that the CMGs' momentum vectors may line up in such a way that a singularity condition is reached. Mathematically, singularities can occur when the eigenvalues of $AA^T$ approach zero, causing $(AA^T)^{-1}$ to approach infinity. Equivalently, singularities occur when the determinant of the matrix $AA^T$ is equal to zero (expressed algebraically as det $(AA^T)=0$). In the case of a 3×n matrix A, this is equivalent to the rank of the matrix $AA^T$ being two or less.

Different approaches have been devised to avoid singularities in the movement of CMGs. In one approach, to ensure that $(AA^T)^{-1}$ never is zero, $(AA^T)^{-1}$ is replaced by $(AA^T+\epsilon I)^{-1}$ where I is the identity matrix and $\epsilon$ is a small number. The use of a positive $\epsilon$ ensures that det $(AA^T+\epsilon I)^{-1}$ never becomes 0.

While useful in some instances, a drawback to this approach is that this approach changes the gimbal rate calculation. In the case of the Jacobian A, the use of the pseudoinverse means that gimbal rates are no longer exactly mapped into the commanded torques because of the error $\epsilon$ introduces. This resulting error steers the spacecraft in the wrong direction and can introduce significant, undesired torque, especially near the singularity.

A second approach is to limit the CMG array's momentum output to a smaller area within a momentum envelope. The momentum envelope is the momentum provided in all possible combinations of the CMGs in the CMG array. In one exemplary embodiment, depending on the CMG arrangement, by operating within one-third or less of the total momentum envelopes, singularities can be avoided. However, this approach wastes potential torque and results in systems that are much larger and heavier than needed.

In view of the foregoing, it is desirable to provide a method for determining a singularity free momentum path that addresses one or more of the foregoing deficiencies or other deficiencies not implicitly or expressly described. It is also desirable to provide a system for determining a singularity free momentum path that addresses one or more of the foregoing deficiencies or other deficiencies not implicitly or expressly described. Furthermore, other desirable factors and characteristics of the present invention will become apparent from the subsequent detailed description and the appended claims, taken in conjunction with the accompanying drawings and the foregoing technical field and background.

SUMMARY OF THE INVENTION

In an exemplary embodiment, a method for avoiding singularities in the movement of a set of collinear CMGs in an array of CMGs in a spacecraft is provided. First, a command to adjust an orientation of the spacecraft is received. Then the momentum needed from the set of collinear CMGs is determined. A dynamic control that determines a momentum path and avoids singularities by rotating the singularities out of the momentum path is used and the required gimbal movement for each of the CMGs in the set of collinear CMGs from the momentum path is calculated.

In another exemplary embodiment, a control system of a spacecraft is disclosed. The control system comprises an attitude control system. The attitude control system is operable to receive a command to adjust an orientation of the spacecraft, determine the momentum needed from the set of collinear CMGs and utilize a dynamic control that determines a momentum path and avoids singularities by rotating the singularities out of the momentum path. The control system further comprises a momentum actuator control processor coupled to the attitude control system. The momentum actuator control processor is operable to calculate a required gimbal movement for each of the CMGs in the set of collinear CMGs from the momentum path. A plurality of CMGs are coupled to the momentum actuator. The CMGs are operable to receive commands from the momentum actuator to change the spacecraft orientation.

BRIEF DESCRIPTION OF THE DRAWINGS

The present invention will hereinafter be described in conjunction with the following drawing figures, wherein like numerals denote like elements, and.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
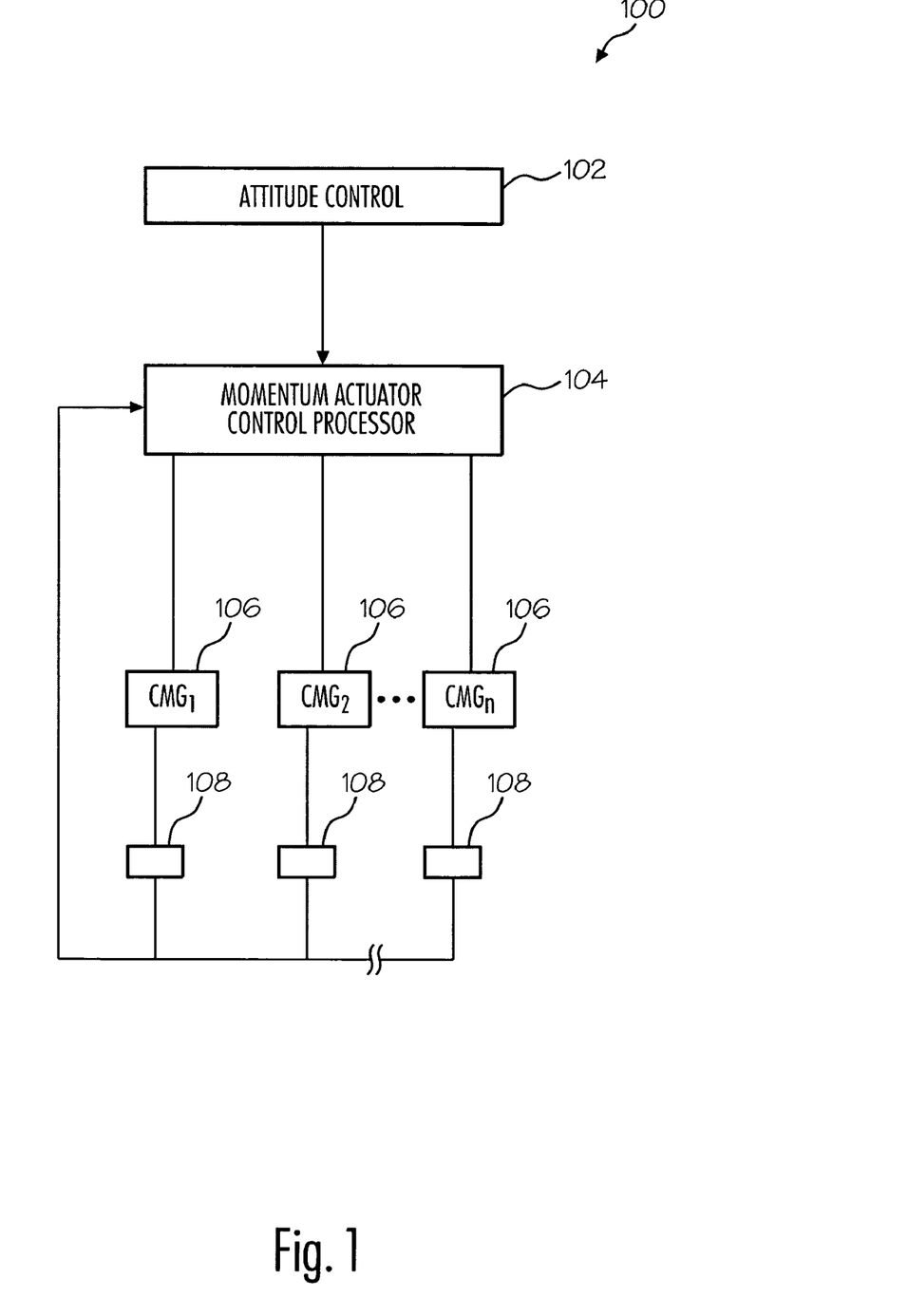
FIG. 1 is a block diagram illustrating an exemplary CMG control system in accordance with an exemplary embodiment of the present invention.

An exemplary control system 100 for implementing the present invention is illustrated in FIG. 1. The components of the control system 100 are known in the art and can be assembled in different ways using different processors, software, controllers, sensors, and the like. Additionally, various computational functionalities that are typically provided by one part of the system can instead be provided by another part. The system 100 as shown in FIG. 1 includes parts that are pertinent to the discussion of the present invention and the system 100 may include other elements or systems that might be provided in a control system and which are well known and not shown in FIG. 1.

The control system 100 includes an attitude control system 102 coupled to a momentum actuator control processor 104. CMGs 106 are coupled the momentum actuator control processor 104. Associated with each CMG 106 are one or more CMG sensors 108 for providing information concerning the state of the CMG 106 to the control system 100. Control system 100, in one embodiment, is mounted on a spacecraft such as an orbiting satellite.

Attitude control system 102 controls the positioning of a spacecraft. The attitude control system 102 receives data concerning a desired spacecraft maneuver and determines an appropriate torque command to complete the desired maneuver. The torque commands can be presented to the momentum actuator control processor 104. The momentum actuator control processor 104, in response to the torque commands, can calculate the gimbal rates necessary to produce the commanded torque. Additionally, the momentum actuator control processor 104 calculates gimbal movement from a momentum path determined by a steering law. The momentum actuator control processor 104, based on these calculations, provides the necessary commands to the CMGs 106 such that the CMG movement produces the commanded torque and, in accordance with the teachings of the present invention, provides the torque while avoiding singularities.

Figure 2:
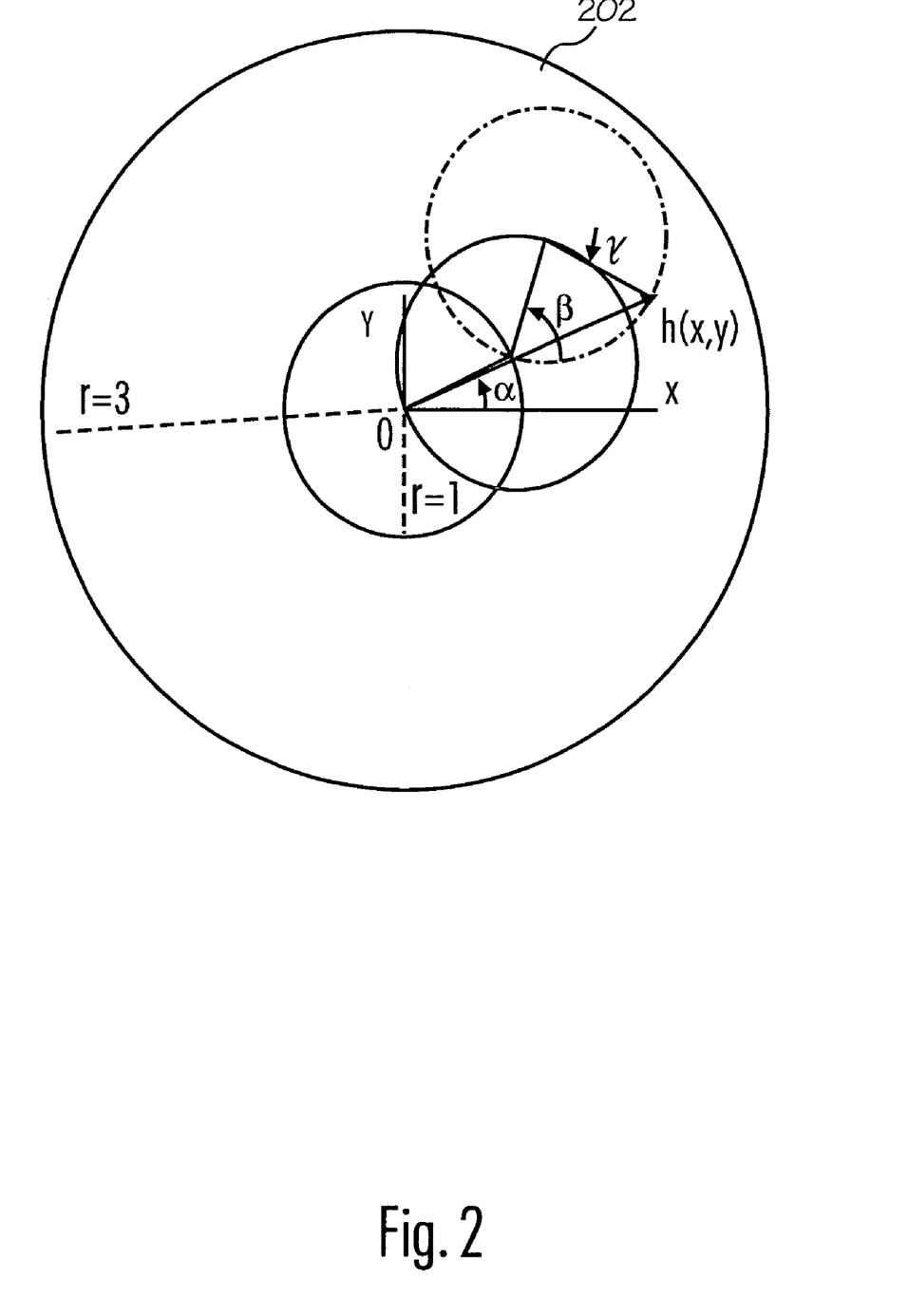
FIG. 2 illustrates the momentum space of a set of collinear CMGs in accordance with an exemplary embodiment of the present invention.

In the present invention, there are multiple gimbal arrays arranged to provide full control over the spacecraft on which they are installed. Each gimbal array, in an exemplary embodiment, comprises a set of collinear CMGs. In one exemplary embodiment, the set includes three collinear CMGs. The momentum of the set of collinear CMGs is restricted to a two-dimensional plane. As seen in FIG. 2, three collinear CMGs can generate a circular momentum space 202 of radius 3. A total momentum vector within the momentum space can be expressed as h={x, y}. The gimbal angles of the three CMGs are given by $\alpha$, $\beta$, and $\gamma$, where the zero gimbal angles are all oriented along the x-axis. The x and y components of the momentum vector are given by the following equations:

$$x = \cos\alpha + \cos\beta + \cos\gamma$$

$$y = \sin\alpha + \sin\beta + \sin\gamma \qquad (3)$$

After determining the momentum vector, places where singularities could exist are determined. First, the Jacobian of the transformation is determined. Given:

$$h(\alpha, \beta, \gamma) = \begin{bmatrix} \cos\alpha + \cos\beta + \cos\gamma \\ \sin\alpha + \sin\beta + \sin\gamma \end{bmatrix}, \qquad (4)$$

the Jacobian can be found by calculating the gradient of the momentum vector:

$$\nabla h = \begin{bmatrix} -\sin\alpha & -\sin\beta & -\sin\gamma \\ \cos\alpha & \cos\beta & \cos\gamma \end{bmatrix}. \qquad (5)$$

As discussed previously, a singularity exists when det$(\nabla h \cdot \nabla h^T)=0$ (i.e. when $\nabla h$ has rank 1)? Using Eqn. 4, the determinate can be calculated:

$$\det(\nabla h \cdot \nabla h^T) = 3 - (\cos^2(\alpha-\beta) + \cos^2(\beta-\gamma) + \cos^2(\gamma-\alpha)). \qquad (6)$$

Eqn. 6 is zero when:

$$1 = \pm\cos(\alpha-\beta) = \pm\cos(\beta-\gamma) = \pm\cos(\gamma-\alpha). \qquad (7)$$

There are only four possible solutions to Eqn. 7. If $r \geq 0$, and $r^2 = x^2 + y^2$ then possible singularities occur at:

| $\alpha - \beta$ | $\beta - \gamma$ | $\gamma - \alpha$ | r |
| --- | --- | --- | --- |
| 0 | 0 | 0 | 3 |
| 0 | $\pi$ | $\pi$ | 1 |
| $\pi$ | 0 | $\pi$ | 1 |
| $\pi$ | $\pi$ | 0 | 1 |

Therefore, if either $\alpha$, $\beta$, $\gamma$ is in a singular configuration, then r=1 or r=3.

The momentum vector h={x, y} can be expressed in polar coordinates {r, $\phi$} as:

$$x = r \cos\phi$$

$$y = r \sin\phi \qquad (8)$$

For $r \geq 0$ and $r^2 = x^2 + y^2$, and for $r \neq 0$, $\phi$ is characterized by:

$$\cos\varphi = \frac{x}{r} \qquad (9)$$

$$\sin\varphi = \frac{y}{r}.$$

Then, for the gimbal angle $\alpha$, the relative polar coordinates $\{r_\alpha, \phi_\alpha\}$ can be defined as:

$$x - \cos\alpha = r_\alpha \cos\phi_\alpha$$

$$y - \sin\alpha = r_\alpha \sin\phi_\alpha \qquad (10)$$

Note that $r_\alpha \geq 0$ is characterized by:

$$r_\alpha^2 = (x - \cos\alpha)^2 + (y - \sin\alpha)^2 \qquad (11)$$

$$= 1 + r^2 - 2r\cos(\alpha - \varphi).$$

and for $r_\alpha \neq 0$, $\phi_\alpha$ is characterized by:

$$\cos\varphi_\alpha = \frac{x - \cos\alpha}{r_\alpha} \qquad (12)$$
$$\sin\varphi_\alpha = \frac{y - \sin\alpha}{r_\alpha}.$$

Using the above equations, all solutions to Eqn. 3 can be parameterized. x, y, r, $\phi$ can be defined as discussed previously, with $0 \leq r \leq 3$. Let $r_\alpha \geq 0$ be as previously defined as $r_\alpha^2 = 1 + r^2 - 2r\cos(\alpha - \phi)$. All solutions $\alpha$, $\beta$, $\gamma$ to Eqn. 3 are characterized by $\alpha$ such that:

$$\cos(\alpha - \varphi) \geq \frac{1}{2}(r - 3/r). \qquad (13)$$

and $\beta$, $\gamma$:

$$\cos\beta = \frac{1}{2}(x - \cos\alpha) \mp \sqrt{\left(\frac{1}{r_\alpha^2} - \frac{1}{4}\right)}(y - \sin\alpha) \qquad (14)$$

$$\sin\beta = \pm\sqrt{\left(\frac{1}{r_\alpha^2} - \frac{1}{4}\right)}(x - \cos\alpha) + \frac{1}{2}(y - \sin\alpha)$$

and $$\cos\gamma = \frac{1}{2}(x - \cos\alpha) \pm \sqrt{\left(\frac{1}{r_\alpha^2} - \frac{1}{4}\right)}(y - \sin\alpha) \qquad (15)$$

$$\sin\gamma = \mp\sqrt{\left(\frac{1}{r_\alpha^2} - \frac{1}{4}\right)}(x - \cos\alpha) + \frac{1}{2}(y - \sin\alpha).$$

Utilizing the above parameterized equations, a fixed control for the collinear CMGs can be determined. A fixed control is a map from the momentum space to the gimbal angles; that is, it is a control scheme for the CMGs that assigns a particular set of gimbal angles to each point in momentum space. Any fixed controller is discontinuous somewhere in the interior of the unit disk of the momentum space.

Thus, a fixed control is a map $\Gamma$ from the reachable momentum space $H = \{(x, y): \sqrt{x^2+y^2} \leq 3\}$ to the space of gimbal angles, $\Gamma(x, y) = \{\alpha, \beta, \gamma\} = \{\alpha(x, y), \beta(x, y), \gamma(x, y)\}$. A singularity of a fixed control is a point $(x, y)$ where the map is not continuous.

Additionally, a fixed control, $\Gamma$, from the reachable momentum space $H = \{(x, y): \sqrt{x^2+y^2} \leq 3\}$ to the space of gimbal angles, has to have a singularity somewhere in the unit disk $H_1 = \{(x, y): \sqrt{x^2+y^2} \leq 1\}$.

Since all fixed controls have singularities within the unit circle, finding a fixed control steering which has a minimal singularity, e.g. only one singularity located on the boundary of $U_1$ will simplify the derivation of a control law.

Given a simple fixed control $\Gamma_\beta^+$, which orients the gimbal $\beta$ along the desired momentum vector, such as $\beta(x, y) = \phi(x, y)$, which chooses one choice of sign, and then which uses simplified versions of the counterparts of Eqns. (13) and (14) to define the remaining two gimbal angles $\alpha$, $\gamma$:

For $\Gamma_\beta^+(x, y)$, define $\begin{cases} \varphi = \arctan 2(x, y) \\ r = \sqrt{(x^2 + y^2)} \end{cases}$ (16)

For $\Gamma_\beta^+(x, y)$, $\beta = \varphi$ (17)

For $\Gamma_\beta^+(x, y)$, $\begin{cases} \cos(\alpha - \varphi) = \frac{1}{2}(r - 1) \\ \sin(\alpha - \varphi) = \frac{1}{2}\sqrt{(3-r)(1+r)} \end{cases}$ (18)

and

For $\Gamma_\beta^+(x, y)$, $\begin{cases} \cos(\gamma - \varphi) = \frac{1}{2}(r - 1) \\ \sin(\gamma - \varphi) = -\frac{1}{2}\sqrt{(3-r)(1+r)} \end{cases}$ (19)

From the above equation, it can be determined that $\Gamma_\alpha^+$ has a single singularity at the origin $(x, y) = (0,0)$. In deriving a control for CMGs it is desirable to have the singularity outside of the origin $(x, y) = (0,0)$. In the following fixed control K has a singularity on the boundary of $U_1$ at $(x, y) = (0, -1)$ and is defined for $r = 1$.

For $K(x, y)$, define $r_\alpha = \sqrt{(x - \cos\alpha)^2 + (y - \sin\alpha)^2}$, then:

For $K(x, y)$, $\begin{cases} \cos\alpha = \frac{-2(1+x)y}{(1+x)^2 + y^2} \\ \sin\alpha = \frac{(1+x)^2 - y^2}{(1+x)^2 + y^2} \end{cases}$ (20)

For $K(x, y)$, $\begin{cases} \cos\beta = \frac{1}{2}(x - \cos\alpha) - \sqrt{\left(\frac{1}{r_\alpha^2} - \frac{1}{4}\right)}(y - \sin\alpha) \\ \sin\beta = \sqrt{\left(\frac{1}{r_\alpha^2} - \frac{1}{4}\right)}(x - \cos\alpha) + \frac{1}{2}(y - \sin\alpha) \end{cases}$ (21)

and

For $K(x, y)$, $\begin{cases} \cos\gamma = \frac{1}{2}(x - \cos\alpha) + \sqrt{\left(\frac{1}{r_\alpha^2} - \frac{1}{4}\right)}(y - \sin\alpha) \\ \sin\gamma = -\sqrt{\left(\frac{1}{r_\alpha^2} - \frac{1}{4}\right)}(x - \cos\alpha) + \frac{1}{2}(y - \sin\alpha) \end{cases}$ (22)

From these equations, for $r = 1$, $$\alpha = \varphi + \frac{\pi}{2} \text{ and } \beta = \varphi.$$

Thus $\Gamma_\beta^+(x, y) = K(x, y)$ on the boundary of $U_1$.

Therefore, an exemplary combined fixed control $\Lambda(x, y)$ that is defined over all of H has only one singularity at $(x, y) = (0, -1)$:

$$\Lambda(x, y) = \begin{cases} K(x, y) & \text{if } \sqrt{x^2 + y^2} < 1 \\ \Gamma_\beta^+(x, y) & \text{if } \sqrt{x^2 + y^2} \geq 1 \end{cases}. \qquad (23)$$

Since a fixed control can be found that has only a singularity at $(x, y) = (0, -1)$, a dynamic momentum controller can be designed that will avoid singularities as it follows a momentum path of fixed maximum velocity. In one exemplary embodiment, to derive a dynamic momentum controller, it is first noted that the gimbal space for three collinear CMGs is rotationally symmetric. If all three gimbal angles are rotated by the same angle, the momentum vector is also rotated by that same angle. In other terms, working with polar coordinates, if $(r, \phi)=h(\alpha, \beta, \gamma)$, then $(r, \phi+\psi)=h(\alpha+\psi, \beta+\psi, \gamma+\psi)$.

Thus, given a fixed control $\Lambda$ (not necessarily the same $\Lambda$ as previously discussed) with known singularities, the CMGs can be dynamically controlled by simply dynamically rotating the singularities away from the current momentum path. Thus, for a given fixed control $\{\alpha, \beta, \gamma\}=\{\alpha_\Lambda(r, \phi), \beta_\Lambda(r, \phi), \gamma_\Lambda(r, \phi)\}$ with a singularity at $(\tilde{r}, \tilde{\phi})$ where $\tilde{r} \neq 0$:

$$(r, \phi)=h(\alpha_\Lambda(r, \phi), \beta_\Lambda(r, \phi), \gamma_\Lambda(r, \phi)). \quad (24)$$

A dynamic winding angle $\psi$ can be defined as $$(r, \phi)=h(\psi+\alpha_\Lambda(r, \phi-\psi), \psi+\beta_\Lambda(r, \phi-\psi), \psi+\gamma_\Lambda(r, \phi-\psi)). \quad (25)$$

By rotating the gimbals by the winding angle the singularity can be relocated to $(\tilde{r}, \tilde{\phi}+\psi)$. The size of the winding angle is chosen to provide avoidance of the singularity while minimizing the amount of extra CMG movement.

Figure 3:
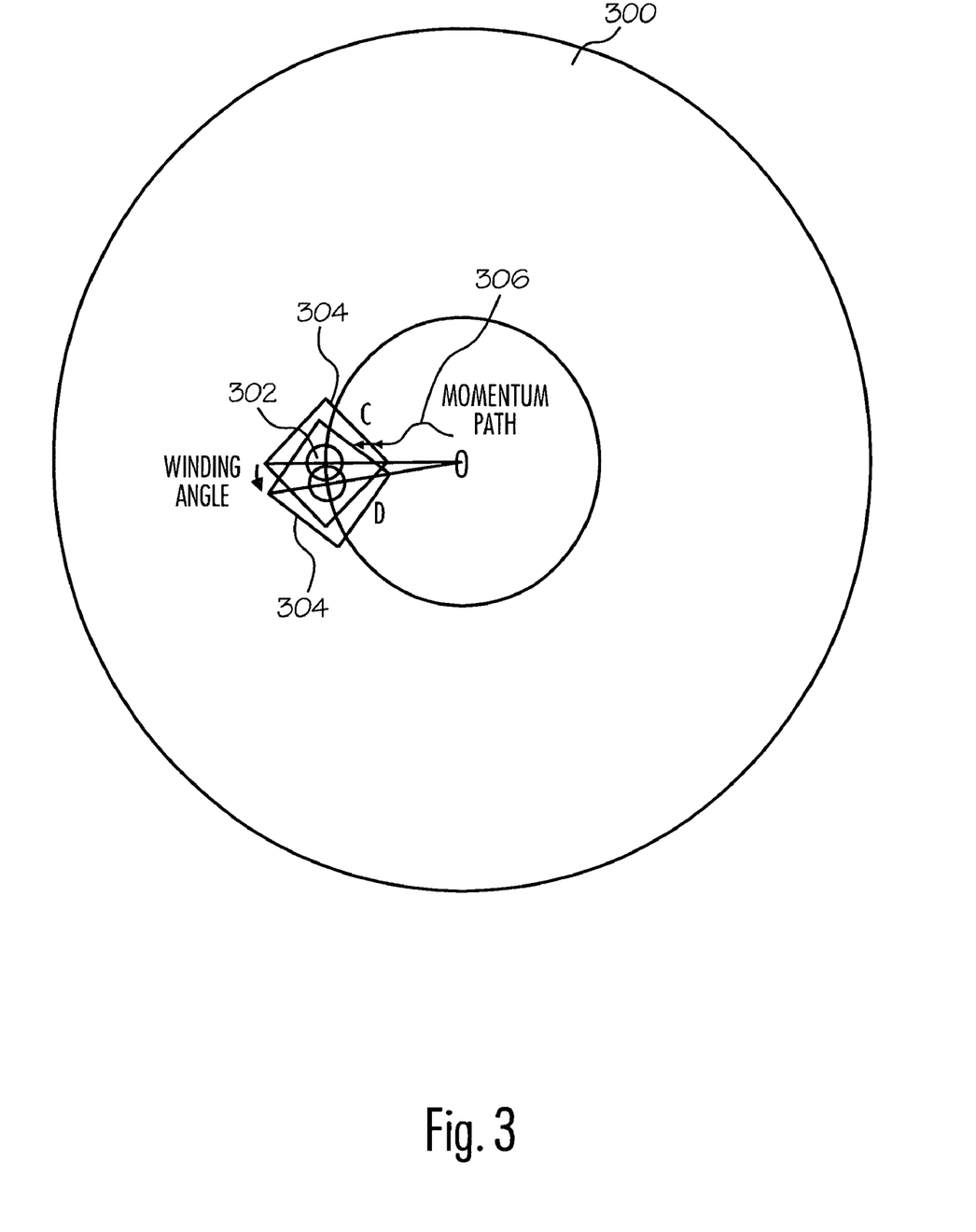
FIG. 3 illustrates the rotation of a singularity when the momentum path approaches the singularity in accordance with an exemplary embodiment of the present invention.

FIG. 3 illustrates an exemplary embodiment of rotation of a singularity. In this example, the momentum space 300 includes a singular point 302 not at the origin. A momentum path 306 is located within the momentum space 300. In FIG. 3, a boundary 304 is placed around a singular point 302, and whenever a momentum path 306 impinges the boundary, the winding angle is changed to rotate the singularity away from the momentum path 306. Note in FIG. 3, the singular point 302 is originally located at point A. When the momentum path 306 impinges the boundary 304 at point C, the singular point 302 is rotated to point B. This will occur each time the momentum path 306 impinges the boundary 304.

The dynamic control resulting from the boundary 304 as shown will be continuous in the gimbal angles, but will have a discontinuous velocity (when the momentum path "hits" the boundary). However, the velocities will be bounded. The derivatives can be made smooth by passing the controls through a simple filter, such as a first-order lag.

There is also a potential ambiguity as to which direction the winding angle should choose if the momentum path 306 is directed directly against one of the vertices of the boundary 304. Any basic choice combined with a hysteresis in the direction chosen will eliminate that issue.

In another exemplary embodiment, given a fixed control with isolated singularities that do not occur at the origin, a dynamic momentum controller can be determined that will avoid singularities as long as the dynamic momentum controller follows momentum paths of fixed maximum velocity.

As before, a fixed control $\Lambda$ (again, not necessarily the same $\Lambda$ as discussed previously) with known singularities ($\tilde{r}, \tilde{\phi}$) where $\tilde{r} \neq 0$ (no singularity at the origin). The winding angle $\psi$ defines a set of fixed controls by:

$$\Lambda_\psi(r, \phi)=\Lambda(r, \phi-\psi)+\psi. \quad (26)$$

which relocates the singularities to $(\tilde{r}, \tilde{\phi}+\psi(t))$.

In this approach, a safety ray consisting of an angle $\overline{\phi}$ such that there are no singular points along that angle $\forall \phi, \phi \neq \overline{\phi}$, and all points along that angle in the momentum space, $\overline{R}=\{\{r, \overline{\phi}\}: 0 \leq r \leq 3\}$. The momentum space can be divided to form into those regions clockwise from $\overline{R}$, $H^-=\{\{r, \phi\}: \overline{\phi}-\pi<\phi \leq \overline{\phi}\}$ and those counterclockwise from $\overline{R}$, $H^+=\{\{r, \phi\}: \overline{\phi}<\phi \leq \overline{\phi}+\pi\}$. A feedback control can be derived that rotates the fixed control, either clockwise or counterclockwise, back to $\overline{R}$. As long as the control in the vicinity of a singularity rotates faster towards $\overline{R}$ than the momentum path can move towards a singularity, the resulting control will be singularity free.

As a specific example, let $\delta>0$ be a distance such that there is no singularity within $\delta$ of $\overline{R}$. Let M be the maximum speed at which to rotate the winding angle (in general, this will be a function of the gimbal angles and fixed control). Then the controller can be defined as the distance arc squared so that the controller will have a continuous derivative:

$$\dot{\psi} = \begin{cases} \min\left(M, \frac{M}{\delta^2} dist^2((x, y), \overline{R})\right) & \text{if} (x, y) \in H^- \\ -\min\left(M, \frac{M}{\delta^2} dist^2((x, y), \overline{R})\right) & \text{if} (x, y) \in H^+ \end{cases} \quad (27)$$

Figure 4:
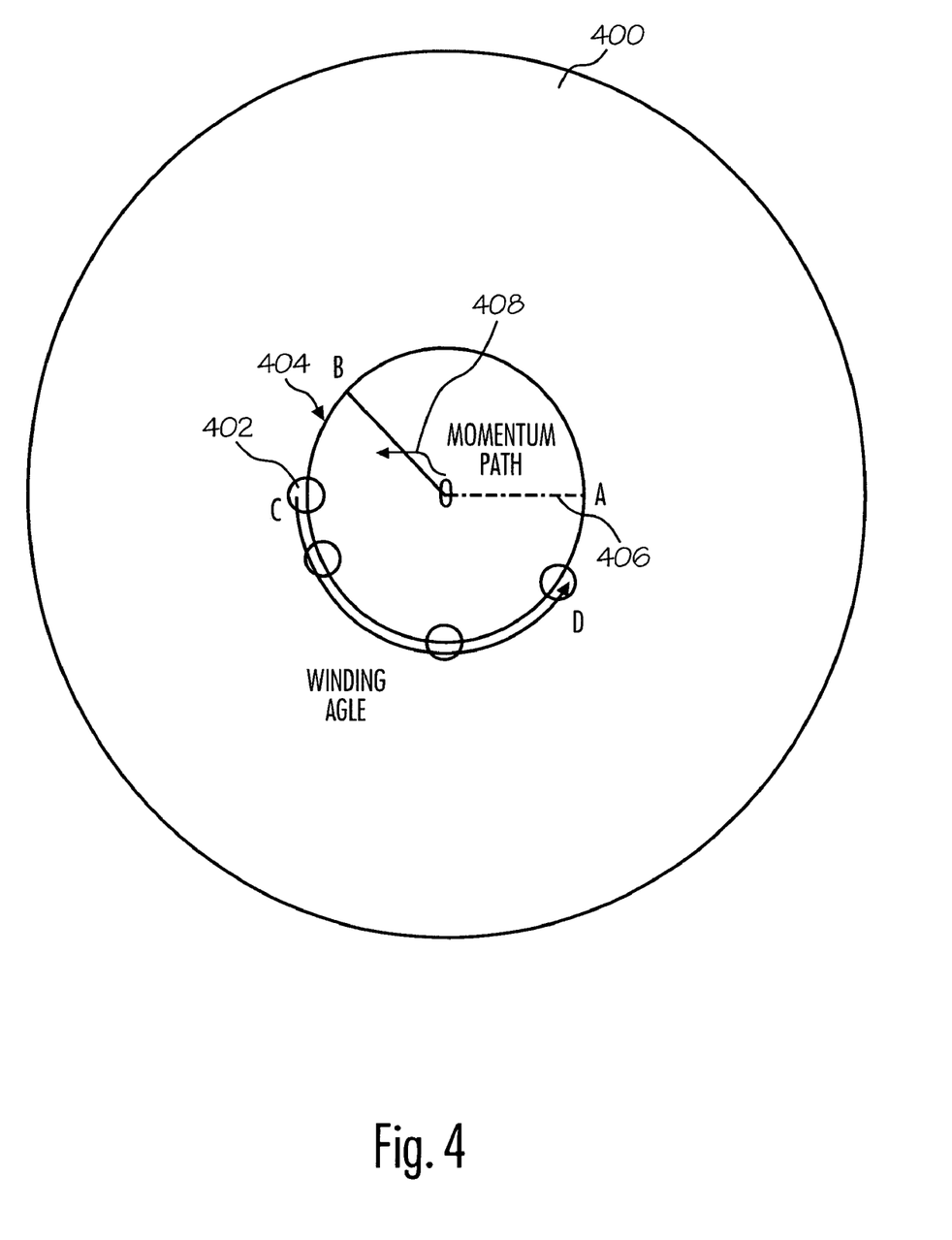
FIG. 4 illustrates the rotation of a singularity away from a momentum path following a safety ray in accordance with an exemplary embodiment of the present invention.

FIG. 4 illustrates an exemplary momentum space 400 which includes a singularity 402 on the inner circle 404 of $r=1$. A safety ray 406 points in a direction away from the singularity 402. A momentum path 408 starts at the origin O and moves along the momentum path 408 to provide the momentum required to assist in spacecraft movement. As the momentum path 408 moves, the safety ray 406 is rotated to keep the momentum path 408 aligned with the safety ray 406. As the safety ray 406 rotates, so does the singularity 402. Note that the safety ray 406 is originally at point A. As the momentum path 408 moves, the safety ray 406 rotates. For the momentum path 408 shown in FIG. 4, the safety ray 406 moves to point B. While the safety ray 406 is moving from point A to point B, the singularity 402 moves from point C to point D.

Figure 5:
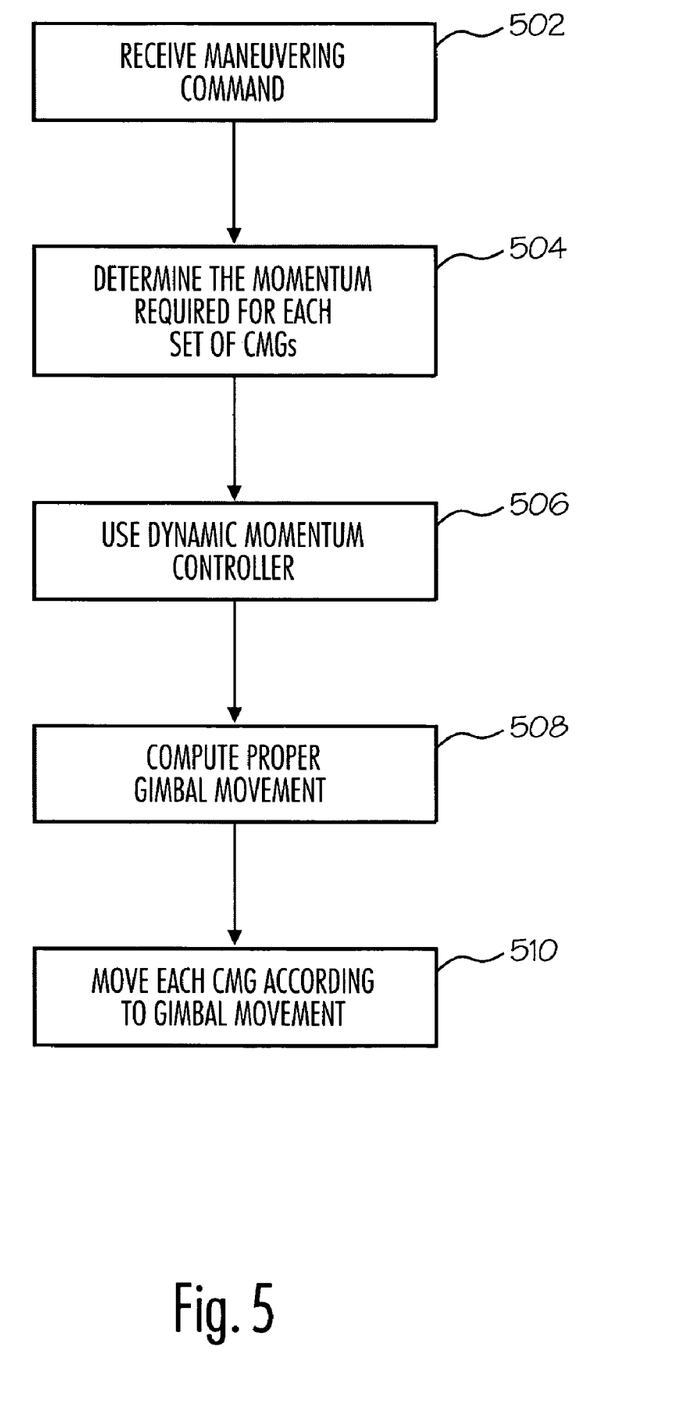
FIG. 5 is a flowchart illustrating a method for maneuvering a spacecraft in accordance with an exemplary embodiment of the present invention.

FIG. 5 illustrates a method 500 for controlling a spacecraft in accordance with the teachings of the present invention. First, in step 502, a maneuvering command to rotate spacecraft orientation is received. In one exemplary embodiment, the maneuvering command is sent from a ground control station to the attitude control system 102 of the spacecraft. Alternatively, the maneuvering command may be generated by the spacecraft based on a preplanned movement schedule.

After the maneuvering command is received, the momentum required for each set of CMGs is determined in step 504. In one embodiment, the needed torque can first be determined and the torque can then be integrated to determine the momentum required for each set of CMGs. These calculations can be done at the attitude control system 102.

In step 506, a dynamic momentum controller is used to provide a singularity free momentum path. The dynamic momentum controller uses a fixed control that includes a single singularity that is not located at the origin. As the momentum moves along the momentum path, the singularity is rotated away from the momentum path.

Once the momentum path is determined, the momentum actuator control processor 104 can compute the proper gimbal movements in step 508. In step 510, the gimbals for each of the three collinear CMGs are then moved to provide the proper momentum.

The exemplary embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed:

1. A control system of a spacecraft for controlling a set of collinear control moment gyroscopes CMGs, the control system comprising:
   an attitude control system operable to:
      receive a command to adjust an orientation of the spacecraft;
      determine a momentum needed from the set of collinear control moment gyroscopes (CMGs) to adjust the spacecraft;
      utilize a dynamic control that determines a momentum path and avoids singularities by rotating the singularities out of the momentum path;
      determine a safety ray that is initially at a fixed angle and all points along that angle in the momentum space is free of singularities; and
      rotate the safety ray to correspond to the momentum path, the singularity rotating away from the momentum path as the safety ray rotates; and
   a momentum actuator control processor coupled to the attitude control system, the momentum actuator control processor operable to calculate a required gimbal movement for each of the CMGs in the set of collinear CMGs from the momentum path.

2. The system of claim 1 wherein each of the CMGs are configured to receive the required gimbal movement from the momentum actuator to change the spacecraft orientation.

3. The system of claim 1 wherein the attitude control system is further operable to rotate the singularity when the momentum path impinges a predetermined boundary surrounding the singularity.

4. The system of claim 1 wherein the attitude control system is further operable to rotate the singularity away from the momentum path as a function of time.

5. The system of claim 1 wherein the attitude control system is further operable to use a fixed control to determine a momentum path with a single singularity not at the origin.

6. A control system of a spacecraft for controlling a set of collinear control moment gyroscopes CMGs, the control system comprising:
   an attitude control system operable to:
      receive a command to adjust an orientation of the spacecraft;
      determine a momentum needed from the set of collinear control moment gyroscopes (CMGs) to adjust the spacecraft;
      utilize a dynamic control that determines a momentum path and avoids singularities by rotating the singularities out of the momentum path; and
      utilize a fixed control to determine the momentum path with a single singularity not at the origin; and
   a momentum actuator control processor coupled to the attitude control system, the momentum actuator control processor operable to calculate a required gimbal movement for each of the CMGs in the set of collinear CMGs from the momentum path.

7. The system of claim 6 wherein each of the CMGs are configured to receive the required gimbal movement from the momentum actuator to change the spacecraft orientation.

8. The system of claim 6 wherein the attitude control system is further operable to rotate the singularity when the momentum path impinges a predetermined boundary surrounding the singularity.

9. The system of claim 6 wherein the attitude control system is further operable to rotate the singularity away from the momentum path as a function of time.

10. The system of claim 6 wherein the attitude control system is further operable to:
   determine a safety ray that is initially at a fixed angle and all points along that angle in the momentum space is free of singularities; and
   rotate the safety ray to correspond to the momentum path, the singularity rotating away from the momentum path as the safety ray rotates.

* * * * *